United States Patent [19]
Crostack

[11] Patent Number: 4,507,966
[45] Date of Patent: Apr. 2, 1985

[54] METHOD AND MEANS FOR IMAGING SOUND WAVES

[76] Inventor: Horst-Artur Crostack, Beringweg 2, D 5860 Iserlohn, Fed. Rep. of Germany

[21] Appl. No.: 438,958

[22] Filed: Oct. 3, 1982

[30] Foreign Application Priority Data

Nov. 4, 1981 [DE] Fed. Rep. of Germany ....... 3143811
Nov. 4, 1981 [DE] Fed. Rep. of Germany ... 8132276[U]

[51] Int. Cl.³ .............................................. G03H 3/00
[52] U.S. Cl. ....................................... 73/603; 73/656; 367/8
[58] Field of Search ........................ 73/656, 603; 367/8

[56] References Cited

U.S. PATENT DOCUMENTS

| | | | |
|---|---|---|---|
| 3,711,823 | 1/1973 | Green | 73/603 |
| 3,772,457 | 11/1973 | Macovski | 73/603 |
| 4,012,951 | 3/1977 | Kessler | 73/603 |
| 4,093,382 | 6/1978 | Kurtz | 73/603 |
| 4,284,324 | 8/1981 | Huignard et al. | 73/603 |

Primary Examiner—Howard A. Birmiel
Attorney, Agent, or Firm—Toren, McGeady and Stanger

[57] ABSTRACT

In the disclosed method and structure a pulse of a sound filed to be mapped is illuminated at at least two extremes values at different moments with a laser beam of short duration compared to the period of the illuminated sound pulse and interference produced between the resulting reflected beam and a reference beam. A holographic image is formed. The relative phase of the laser pulse and the reference is changed between the individual illuminations by a preselectable amount which deviates from $\pi$ and which suppresses the optical and/or acoustical noise. Specifically, a time delay initiates the first illumination process when an extreme value is reached at the beginning of the sound pulse to be mapped. A counter is started by this time delay and counts the half and quarter waves of the sound pulse. The counter initiates an additional illumination process after a preselectable odd number has been reached. A phase shifter changes the relative phase between the object beam and the reference beam.

22 Claims, 3 Drawing Figures

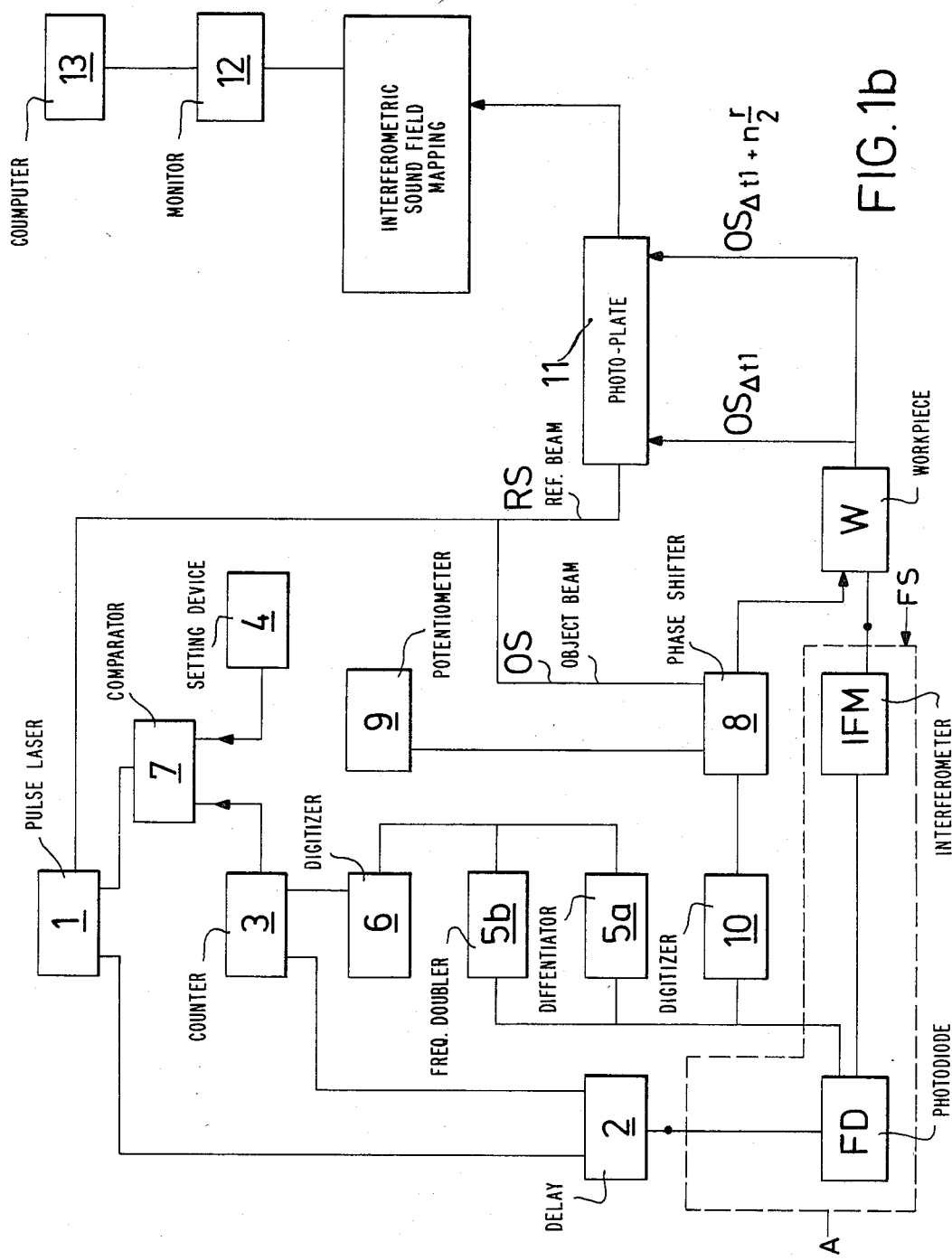

METHOD AND MEANS FOR IMAGING SOUND WAVES

The invention relates to a method of imaging (or mapping) sound fields, particularly ultrasonic fields, with the aid of optical holographic interferometry. Here, at least two beams, which originate from the object to be imaged at different moments, and which have at least one of the beams holographically imaged and reconstructed after interference with a reference beam, are holographically superposed into an interferogram which can be evaluated.

In addition, the invention relates to an arrangement for imaging sound fields, particularly ultrasonic fields, with the aid of optical holographic interferometry, having a unit for illuminating the object to generate the object beams, a unit for controlling the individual illumination processes, a unit for generating reference beams for interference with the object beam reflected by the object, or illumination of a preceding hologram, at least one device for taking a hologram and at least one unit for the holographic superposition of the beam paths after exposures.

The invention is particularly for use in testing for damaged areas of devices and structural parts, as well as for the control of devices and structural parts. However, the invention need not be applied only to these areas, but may be applied to any other field in which occurring sound waves of small amplitude are to be simultaneously, comprehensively, and surface imaged.

Today, ultrasound is extremely important in the field of non-destructive material testing but also in other fields, such as medical diagnosis as a means for volumetrically operative test procedures. This applies to acceptance testing as well as to inspections and repeated tests. In ultrasonic testing, an ultrasonic pulse is transmitted into the structural part to be tested and the reaction between the ultrasound and the material is determined and observed and, if necessary, registered and evaluated. Techniques have become known to optimize the test pulses with regard to their duration, amplitude, and spectrum content and to adapt them to the respective situations. In this connection, reference may be had to the publication by H. A. Crostack, V. Deutsch, H. D. Steffens, H. A. Stelling and M. Vogt "Ultrasonic Testing With Transmitting Pulses of Continuously Varying Frequency and Controllable Spectrum Distribution" in "Materialpruefung 20", 1978, pages 372/7.

The problem setting on which the invention is based will be elucidated below with reference to the invention's main areas of application.

Piezoelectric sound transducers which are usually used for generating and recording ultrasound do indeed have high sensitivies; however, they have some important disadvantages.

A. The specified dimensions of the resonator as well as the wavelength of the ultrasound result in a sound field which includes a near field and a self-opening remote field.
  1. The near field has the disadvantage in that the possibilities for testing are limited due to the strongly fluctuating intensity in this field.
  2. The fact that the achievable information extends to the entire cross-section of the sound field, has the following disadvantageous effects:
    (a) An object to be tested must be scanned according to the dimensions of the sound field so that the entire information cannot be achieved at the same time, i.e., it is necessary to scan with numerous signals.
    (b) On the other hand, the signal contains the integral information on the entire sound field cross-section, so that, for instance, the interfering structural noise increases in relation to an error echo with the magnitude of the sound field, (See H. A. Crostack "Contribution for the Improvement of Ultrasonic Testing During Determination of Errors in Workpieces Which Are Difficult to Test", Rehabilitationsschrift Universitaet Dortmund, 1978).
    (c) Integration over the sound fields also causes poor lateral resolution. This means that the echoes of many small errors or defects or faults inside the sound field at the same distance cannot be differentiated from one another and not from the echo of an individual, larger defect. A base value which can be given for the lateral resolution for normal test heads is approximately ten times the wavelength. To the extent that the sound field is specially shaped, (focus heads), this value can be reduced; however, this results in more extensive scanning of the workpiece and in deterioration of the axial resolution, so that this technique only has practical importance in connection with a frequency-dependent test. We refer, in this connection, to the above-mentioned publication in "Materialpruefung" 20, 1978, pages 372/7.

B. In addition, there are some further restrictions in the testing by means of ultrasound-pulse-echo techniques which relate to defect detection and also particularly to defect description.
  1. The length of the pulse, the post-resonance behavior of the test head, and the characteristics of the electronic equipment, result in a so-called "dead zone" which prevents testing of zones near the surface as well as of thin materials and coatings.
  2. In addition, the great length of the pulse (in ordinary test heads $5 \cdot \lambda$) brings on a limited axial resolution which makes the interpretation of the indication particularly difficult. This reduces the resolution of several defects which are located at different distances. If the length of the pulse is reduced (shock wave heads), then problems result due to undefined changes in the frequency spectrum. Since the reaction between ultrasound and defect are frequency-dependent, a defect evaluation which can be surveyed requires a defined frequency spectrum. We refer, in this connection, to the publication by H. A. Crostack and W. Oppermann in "materialprufung" 21, (1979), 12, pages 449/54.

C. In addition to the above-explained problems, difficulties also exist due to the coupling of the piezoelectric heads at the test specimen. This coupling, which usually takes place by means of liquids or pastes, fails with rough surfaces or complex geometry, (see H. A. Stelling "Analysis Procedures", Course of Instruction "Ultrasound II", Technische Akademie Esslingen 24, June 26, 1980). In addition, in hot or possibly contaminated parts, no such coupling can take place.

Similar difficulties regarding the sound fields of the test heads, the sensitivity, as well as the coupling, result when receiving solid-conducted sound and sound emissions.

In order to correct the difficulties during coupling, a system which operates without contact has been introduced.

Here, one may proceed with optical means, wherein the two-beam interferometer is particularly applied. We refer to "Optical Probing of Surface Waves and Wave Devices" by G. I. Stegmann, IEE Trans. Sonics Ultrasonics, SU-23, 1, 33–63, 1976. However, this technique still has some disadvantages. In particular, the surface must be flat and smooth, i.e., smoothly ground. Therefore, the method cannot be applied on technically rough surfaces. If a larger structure is to be mapped, the respective parts must be scanned. The thus resulting time losses, however, do not permit a simultaneous mapping of a process because the time duration for scanning is greater as compared to the duration of the ultrasonic pulse. To the extent that pulse sequences are possible, the test duration increases in such a way that a realization is technically uninteresting. This technique was also described by C. H. Palmer, R. O. Claus and S. E. Fick in a publication "Ultrasonic Wave Measurements by Differential Interferometry" in Appl. Opt. 16, No. 7, 1849 to 1956, 1977.

Optical holographic interferometry offers significantly better possibilities for solution. This is described by Ch. M. Vest in "Holographic Interferometry", Wiley & Sons, New York 1979. This method makes it possible to detect deformations on technically rough surfaces and to simultaneously show them comprehensively in an image on a large surface. (See W. Jueptner and H. A. Crostack in "Tests of Characteristic Stresses in Spot-Welded Connections", Laser '73 Optoelectronics, München 1973, Report Volume, pages 134 to 138.)

Optical holographic interferometry is also already in use for detection of vibrations as so-called vibration holography, as can be read in L. A. Kersch in "Laminate Structure Inspection" in: R. K. Erf, (Editor): "Holographic Non-Destructive Testing", Academic Press, New York, 1974. The processes of reference beam modulation also belong in this group. However, these processes are relatively insensitive, so that detection of ultrasonic fields with high frequency and/or small amplitude as well as detection of material defects and thus its use in non-destructive testing is strongly limited. The excited vibrations must, in order to be detected, lie in the characteristic frequencies of the structural part. This means:

that stationary waves with resonances, i.e., vibration nodes and anti-nodes occur, so that the different points of the structural part are excited with different amplitudes. Therefore, equally large errors at different locations will show up differently.

Since the characteristic frequency rapidly decreases in increasingly thicker structural parts, and the defect detectability is however connected directly with the wavelength, the ability to detect defects also rapidly decreases (J. and H. Krautkraemer "Material Testing with Ultrasound", 4th Edition, 1980, Springer-Verlag).

Since, in complicated geometries, such characteristic frequencies cannot be excited in a sufficiently defined and intensive manner, defect detection is impossible here.

In any case, only relatively large errors which are greater than 20% of the wall thickness can be detected with the process of reference beam modulation, as also described in the aforementioned publication by L. A. Kersch.

In summary, the following is established:

For the aforementioned reasons, mapping or imaging of ultrasonic fields which are affected by material defects involve difficulties as does the determination and description of errors using known processes, even in simple structural parts, such as plates or pipes. In complicated geometries, such as exist in plants and machines, as well as on technically rough structural parts, imaging becomes impossible.

The invention has achieved the object of creating a method and an arrangement which enable improved detection of material errors as well as an improved resolution and description of the form of the defect, so that, in a simple manner, mapping of small sound amplitudes is possible in a comprehensive and planar manner on technical surfaces. The invention originated from the basic concept of achieving imaging of very small vibration amplitudes by way of simple control of the phase of optical illumination and the selection of the phase transition in optical holography, i.e., by means of the aforementioned measures which achieve a corresponding increase in sensitivity in optical holography.

The method according to the invention comprises illuminating a pulse of the sound field to be mapped at at least two extreme values, i.e., a minimum and a maximum, at different moments with a laser pulse of a duration which is short compared to the duration of the illuminated pulse, and that thereat the relative phase of the laser pulse and a reference beam which was made to interfere with the laser pulse after illumination is changed between the individual illuminations by a preselectable amount which deviates from $\pi$ and which suppresses the optical and/or acoustical noise during the interferogram.

The arrangement according to the invention is characterized by a time delay which releases the first illumination process when an extreme value at the beginning of the sound pulse to be mapped has been reached, by a counter which is started by this time delay for counting the half or quarter waves of the sound pulse and which, after reaching a preselectable odd number, by means of a comparator, triggers another illumination process, a phase shifter which is settable with regard to the value of the phase transitions and changes the relative phase between the object beam and the reference beam, as well as a pulse generator which digitizes the frequency of the sound signals and controls the phase transitions in the cycle of the carrier frequency of the sound signals.

Additional features of the invention are the subject matter of the subclaims.

The invention is elucidated with the aid of the drawings in the following description of two exemplified embodiments of an arrangement for performing the method according to the invention.

In the drawings:

FIG. 1b shows a block diagram of an arrangement for mapping of an independently excited ultrasonic field.

Figure 1A:
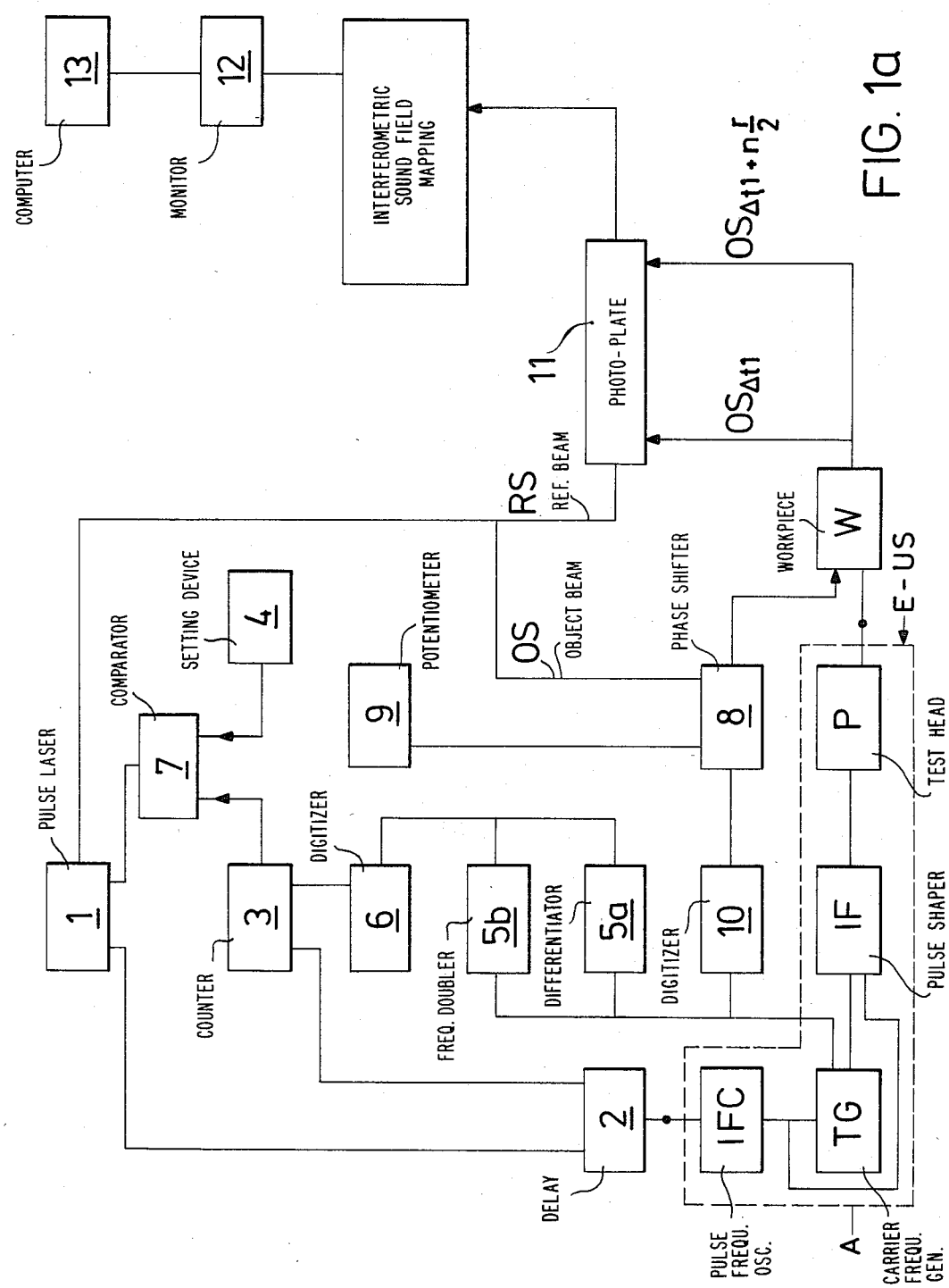
FIG. 1a shows a block diagram of an arrangement for mapping of a self-excited ultrasonic field.

In the arrangement shown in FIG. 1a, the invention was used within the scope of an arrangement for the non-destructive material testing by means of ultrasound, while the arrangement according to FIG. 1b is intended for control regarding independently excited ultrasound within the scope of surveillance of damaged areas and the detection of such damaged areas.

The ultrasound-self-excitation takes place in the arrangement according to FIG. 1a by means of a structural unit E-US which has a carrier frequency generator TG for generation of ultrasonic vibration with the test frequency, a pulse shaper IF which is controlled by a pulse frequency oscillator IFO, and a test head P. The pulse shaper IF determines the duration and shape of the pulse in which the oscillation fed from the carrier frequency generator TG is modulated and the pulse shaper conducts these pulses with the pulse sequence frequency determined by the oscillator IFO to the test head P from which they are conducted into the workpiece W to be tested. The entire process is put into operation by external equipment A. In the arrangement according to FIG. 1b, the surface of the workpiece is checked by means of the structural unit FS for the occurrence of an independently excited sound field. This unit has a sound receiver for detection of the independently excited sound field and for release of the holographic illumination process, for instance, a point scanning interferometer IFM and a photodiode according to G. I. Stegmann (See page 6, last paragraph).

The structural units E-US and FS may be constructed as exchangeable structural units which can be used as desired in the entire arrangement for interaction with the remaining units of the entire arrangement, which coincide in the embodiments according to FIGS. 1a and 1b. Therefore, the following description of these units, intended for holographic illumination and establishment of the interferogram, refer to FIG. 1a as well as also to FIG. 1b.

Generation of the object beam OS which serves for the specimen and ultrasonic pulse illumination and of the reference beam RS which is brought to interfere with the object beam takes place by means of a pulse laser or by means of a laser which is clocked stroboscopically by means of an acousto-optical decoupler (or output or neutralizer). The starting signal for the first illumination is fed to the pulse laser 1 by means of a settable delay 2. This starting signal is taken in the arrangement according to FIG. 1a simultaneously with the introduction of the first pulse in the workpiece W from the pulse frequency oscillator IFO and, delayed by the time $\Delta t$, which corresponds to the travel time of the ultrasonic pulse in the workpiece W, fed to the pulse laser 1. In the arrangement according to FIG. 1b, this starting signal is taken from the photodiode FD and delayed by the time $\Delta t$, which is equal to the travel time of the sound pulse from the location of the trigger (here, Michelson Interferometer). The signal transmitted from the delay 2 also puts a counter 3 in operation which, after a time, selectable by means of a setting device 4, releases after the first illumination the second illumination process. The counter 3 counts the half or quarter waves of differentiated or squared and doubled carrier frequency which was conducted to the counter by means of a differentiation unit 5a or a frequency doubler 5b as well as a digitizer 6 from the carrier frequency generator TG (FIG. 1a) or from the photodiode FD (FIG. 1b). By means of the setting device 4, the number of half and quarter waves can be selected and after they pass through the counter 3, the second laser pulse is transmitted which follows the first laser pulse after a selectable time $\Delta t1 \pm n \cdot (\tau/2)$ wherein n is an integral odd number and $\tau$ is a whole or half period of the vibration. A comparator 7 compares the selected number of half or quarter waves with the counted number and releases a laser pulse when the set number has been reached.

In the currently selected embodiment, the laser pulse which is used as the object beam OS is directed onto the workpiece surface to be optically stimulated or onto the specimen area to be surveyed by means of a phase shifter 8 which is introduced into the beam path. The value of the phase transition $\pi \pm \epsilon$ to be effected by the phase shifter 8 is freely selectable by means of a potentiometer 9 (applied voltage) and is adapted to the test conditions (noise of the photocathode, required contrast) in such a way that it generates a background brightness which suppresses the optical noise of the photoplate or photocathode during subsequent holographic-superposition (interferometry) of the two recordings, or corresponds to an acoustic threshold value. A signal which is digitized in the digitizer 10 and is received from the carrier frequency generator TG or from the photodiode FD is applied to the phase shifter 8 and the phase is shifted in the cycle of the carrier frequency with this signal.

The object beam at the time $\Delta t_1$ (first laser pulse) which, for instance, has the phase 0 (FIG. 2) is reflected by the workpiece, interferes with the reference beam RS which originates directly from the pulse laser 1, and is held on a photographic plate or an instant camera 11 for the purpose of recording a hologram.

Using the second laser pulse which is released at the moment $\Delta t_1 + n \cdot (\tau/2)$ and which deviates in phase relative to the first pulse by a value $\pi \pm \epsilon$ different from $\pi$, the hologram, after complete interference with the reference beam RS, is illuminated for the second time and subsequently reconstructed. Or the second illumination process is used for direct reconstruction of the hologram and the interference information is, for instance, photographed or detected with a camera and a monitor 12 and fed to a computer 13 and quantitatively evaluted. In any case, in the reproduction of the hologram, the sound field is already recognizable as to its form, its structure, and its dimensions in the reconstruction of the hologram, by virtue of its interference fringes.

Figure 2:
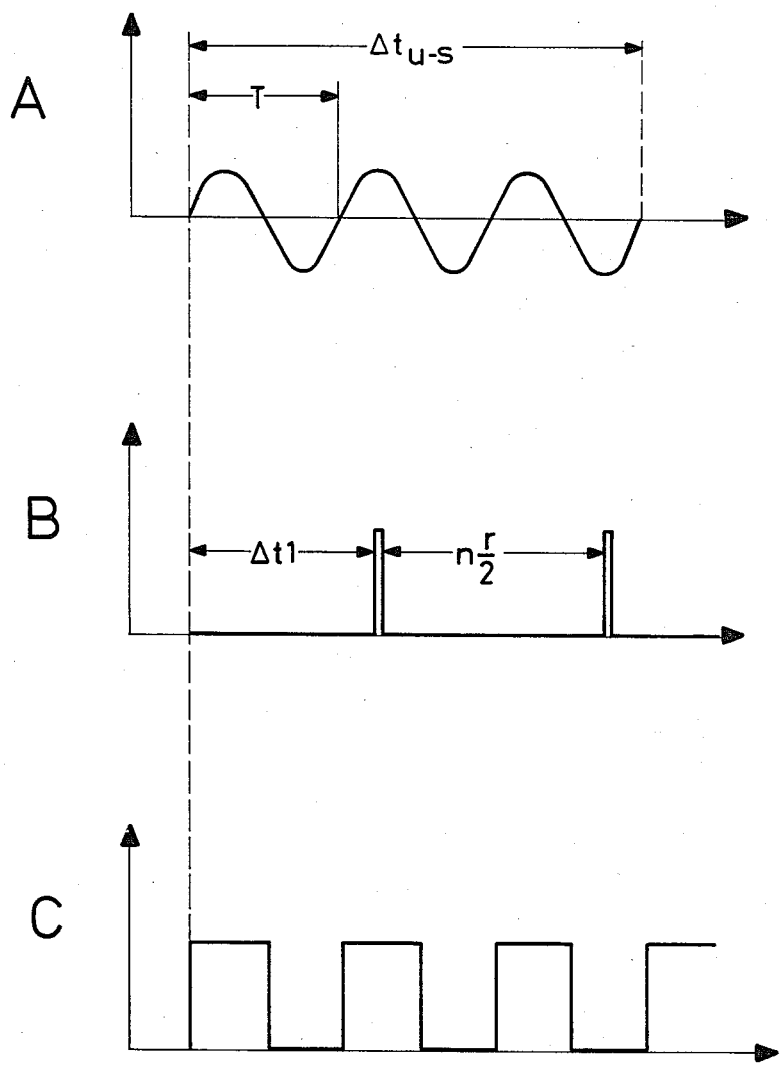
FIG. 2 shows a diagrammatic sketch to clarify individual process measures.

FIG. 2 serves to illustrate the process to be performed with the above-described arrangement. Illustration A shows the course of the ultrasonic pulse to be imaged and having the period T and the duration $\Delta t_{U-S}$ corresponding to the monitored area. Illustration B shows the release of the laser pulse at the moments $\Delta t_1$ and $\Delta t_1 + n(\tau/2)$ wherein n is a preselectable integral odd number and is $\tau = T$ or $T/2$. The value $\Delta t_1$ is equal to the travel time of the ultrasonic pulse from the location of the trigger (US transmitter or Michelson interferometer) up to the area to be mapped. The relative phase ($\pi \pm \epsilon$) between the reference beam and the object beam is to be determined in dependence on the time from graph C.

The method and arrangement according to the invention also makes possible detection of sound fields of small amplitude and optical mapping of such sound fields. With it, the increase in sensitivity compared to the known holographic techniques is approximately 25 times greater in visual evaluation.

The important criteria for the technical process achieved with the invention are to be seen in the following facts:

high frequencies and therefore small errors can be detected.

Small amplitudes and thus structural inhomogeneities, such as scattering indications can be detected.

Use can be made of ultrasonic pulses of high frequency and small amplitude which, contrary to standing waves (resonances), have the same sensitivity compared to errors in the entire specimen area.

In complicated specimen geometries, the monitored specimen area can be limited because the length of the ultrasonic pulse—considering $n \cdot (\tau/2)$—corresponds to the monitored area.

Although a preselectable surface which is as large as desired can be optically stimulated, details of the sound field are illustrated with high accuracy corresponding to the optical resolution.

The signal-noise ratio is improved in the ultrasonic test of coarse grained materials because the scattering indication no longer occurs as integration of all individual scatters, but images the individual stray fields separately. Thus, the signal-noise ratio which depends on the ratio of the sound field cross-section/pulse length/scattered particle size is increased during error detection.

Due to the selection of the phase transition $\pi \pm \epsilon$, the sensitivity can be adapted to the optical as well as the acoustical noises, so that a direct registration of all larger indications can take place (sound wave registration).

The axial and lateral resolution is significantly raised in comparison to the resolution which can be achieved with the ultrasonic technique, so that details which are far below a wavelength are still recognizable.

Due to this high resolution, the recognition of error shape, size and position is significantly improved in volume waves as well as also in guided waves.

The stray fields of defects also become visible in types of waves which in the undisturbed state do not reach the surface, for instance, parallel extending longitudinal waves and transverse waves of different polarization. Therefore, defects under rough surface surfaces become detectable and can be better evaluated.

Due to the free selection of the ultrasonic pulses, even complicated geometries can be tested.

In independently excited fields, the direction of origin and possibly also the location of the excitation become visible by mapping the field.

I claim:

1. A method for imaging sound fields using optical holographic interferometery, comprising; applying sound pulses to an object to be imaged to form sound fields, illuminating the sound fields with laser pulses of periods shorter than the periods of the sound pulses to form object beams, forming reference beams for interference with the object beams, holographically superimposing two object beams which originate at different moments in time from the object to be mapped into an interferogram, the step of illuminating occurring for two pulses of the sound field to be imaged at a minimum value and a maximum value, at different moments in time, and changing the relative phase of the laser pulse and the reference beam which interferes with the illumination between the individual illuminations by a preselectable amount which deviates from $\pi$ and which suppresses the optical or acoustical noise in the resulting interferogram.

2. A method according to claim 1, characterized in that the sound pulses are ultrasound pulses and the object is being subjected to non-destructive material testing by means of the ultrasound pulses, the ultrasonic pulses being introduced by the ultrasonic transmitter into the object to be tested and being illuminated by the laser pulse after passing through the test object.

3. A method according to claim 1, characterized in that, during the mapping of an excited sound field, the latter is detected at a point within the measuring field by means of a sound receiver.

4. A method as in claim 3, characterized in that the sound receiver is a point scanning interferometer.

5. A method according to either of claims 1, 2, or 3, characterized by using the second of the two illumination for the direct reproduction of a hologram produced by means of the first laser pulse, and by displaying the interference information and feeding it to a computer and to be quantitatively evaluated.

6. A method as in claim 5, wherein the interference information is displayed by a monitor.

7. A method according to either of claims 1, 2, or 3, characterized in that the sound pulses have a carrier frequency and means responsive to the carrier frequency for generating therefrom a signal for release of the first laser pulse.

8. A method according to either of claims 1, 2, or 3, wherein the sound pulses have a carrier frequency and wherein a relative phase difference exists between the object beam the step of the reference beam, and shifting the relative phase in the cycle of the carrier frequency of the illuminated sound pulse.

9. An interferometer arrangement for imaging sound fields, particularly ultrasonic fields in a test piece, comprising:
pulse means for generating sound pulses in a test piece, generation means for generating object beams directed at the test piece and for generating reference beams for interference with the object beams reflected from the test piece, a timing unit for timing and controlling the generation of the object beams for holographic superposition of the beam paths, a time delay means for causing said generation means to produce an object beam when an extreme value at the beginning of the sound pulse to be mapped is reached, counting means started by the time delay for counting half or quarter waves of a sound pulse and for causing said generation means to generate an additional object beam after a preselected time delay, a phase shifter settable in relation to the magnitude of phase transitions to change the relative phase between the object beam and the reference beam, and a pulsing member for controlling the phase transitions in the cycle of the carrier frequency of the sound signal.

10. An arrangement as in claim 9, wherein said pulse means is arranged to digitize the frequency of the sound signals.

11. An arrangement as in claim 10, wherein said counting means includes a counter for counting the pulses, a time setting device, and a comparator for comparing the counter and the time setting device.

12. An arrangement according to claim 9, characterized in the generating means includes a pulse sequence frequency oscillator for controlling the time delay and a test head coupleable to the test piece.

13. An arrangement according to claim 12, characterized in said generating means further including a carrier frequency generator and a pulse shaper and forming an exchangeable structural unit.

14. An arrangement according to claim 9, characterized in said generating means including a sound receiver for accepting an independently excited sound field.

15. An arrangement as in claim 14, wherein said sound receiver is a scanning interferometer.

16. An arrangement as in claim 14, characterized in that said generator further includes a photodiode for control of said time delay, said photodiode being connected to said interferometer.

17. An arrangement according to claim 16, characterized in that said phase shifter is in the path of the object beams and said photodiode is connectable to the digitizer for controlling said phase shifter.

18. An arrangement according to either of claims 14, 16, or 17, characterized in that said interferometer is assembled into an interchangeable structural unit with said photodiode.

19. An arrangement according to either of claims 9 or 11, characterized by said counting means including a counter, a differentiator and a digitizer, said differentiator and said digitizer being connected to said counter.

20. An arrangement as in claim 13, characterized by said counting means including a counter, a differentiator, and a digitizer, said differentiator and said digitizer being connected between said oscillator and said counter.

21. An arrangement according to any one of claims 9 to 17, characterized by said counter means including a counter, a frequency doubler and a digitizer, said doubler and said digitizer being connected to said counter.

22. An arrangement as in claim 13, characterized by said counter means including a counter, a frequency doubler, and a digitizer, said doubler and said digitizer being serially connected between said oscillator and said counter.

* * * * *